United States Patent [19]

Sticht

[11] 4,369,872
[45] Jan. 25, 1983

[54] APPARATUS FOR THE MANUFACTURE AND/OR HANDLING OF WORKPIECES

[76] Inventor: Walter Sticht, Wankhamerstrasse 8/48, Attnang-Puchheim, Austria, A-4800

[21] Appl. No.: 186,655

[22] Filed: Sep. 12, 1980

[30] Foreign Application Priority Data

Oct. 31, 1979 [AT] Austria .................................. 7023/79

[51] Int. Cl.³ ............................................ B65G 47/04
[52] U.S. Cl. ..................................... 198/339; 198/486; 414/225; 414/744 A; 414/753
[58] Field of Search ........ 198/486, 489, 653, 694–696, 198/339; 414/225, 226, 744 A, 744 B, 749, 751, 752, 753

[56] References Cited

U.S. PATENT DOCUMENTS

| | | | |
|---|---|---|---|
| 3,099,873 | 8/1963 | Brainard et al. | 198/339 X |
| 3,760,956 | 9/1973 | Burch | 414/744 |
| 4,177,002 | 12/1979 | Motoda et al. | 414/751 |
| 4,260,319 | 4/1981 | Motoda et al. | 414/749 |

FOREIGN PATENT DOCUMENTS 2028813 8/1971 Fed. Rep. of Germany .
1331499 9/1973 United Kingdom .

Primary Examiner—John J. Love
Assistant Examiner—Douglas D. Watts
Attorney, Agent, or Firm—Kurt Kelman

[57] ABSTRACT

An assembly line comprises a succession of work stations and a conveyor transporting workpieces from, to and between the stations. A mechanism is associated with each work station for handling a respective workpiece and includes a plurality of rectilinear guide tracks extending at an angle to each other, a gripping element movable along the guide tracks and a drive associated with the guide tracks for moving the workpiece between a first working position within the range of the conveyor and a second working position spaced therefrom. A first one of the guide tracks extends parallel to the elongated guide for the conveyor and two additional guide tracks extend, respectively, in a plane parallel to the plane defined by the elongated conveyor guide and transversely thereto, and the other additional guide track extends in a plane perpendicular thereto. A control operates the drives in a programmed sequence.

26 Claims, 13 Drawing Figures

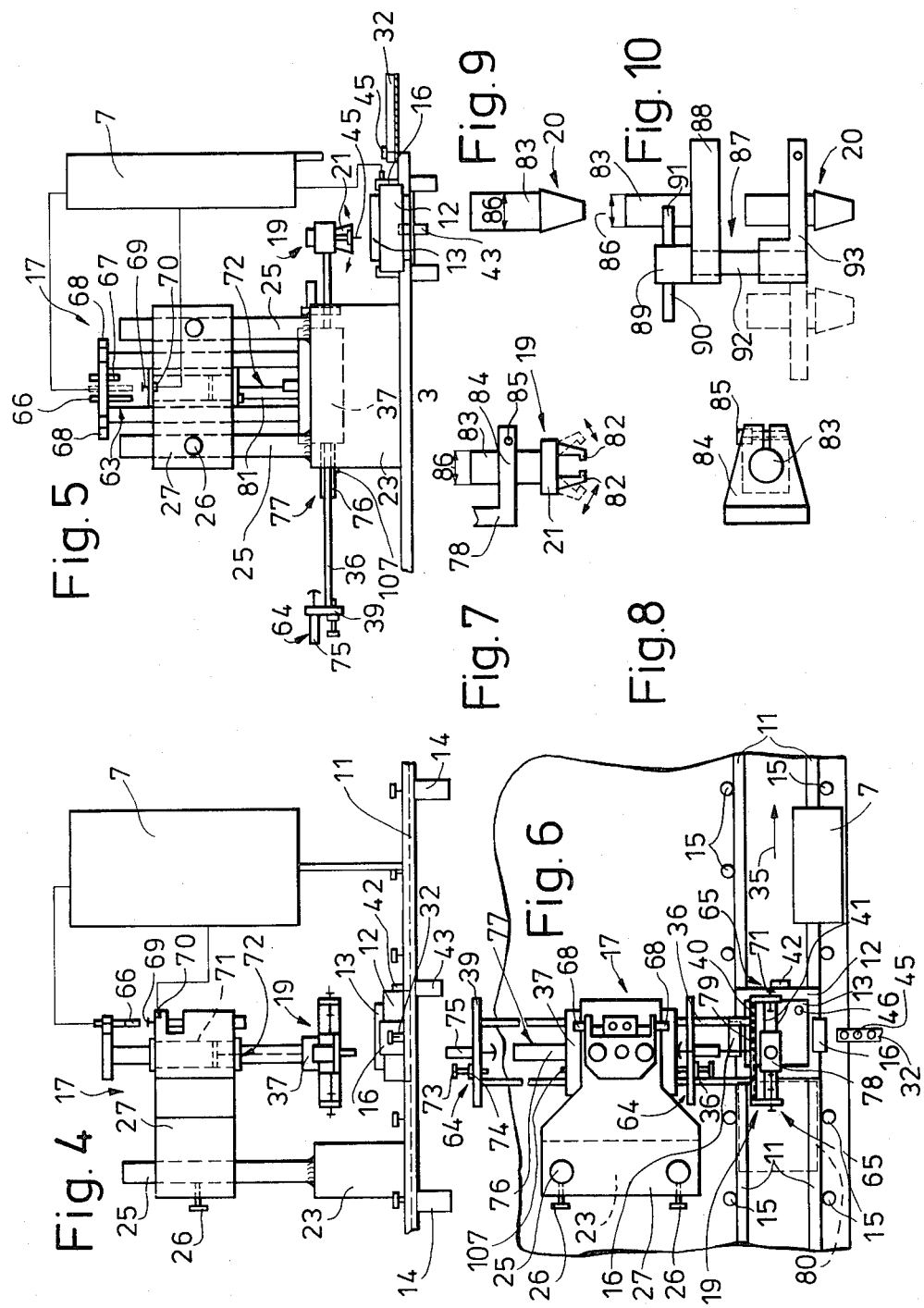

APPARATUS FOR THE MANUFACTURE AND/OR HANDLING OF WORKPIECES

The present invention relates to an apparatus for the manufacture and/or the handling of workpieces, such as assembly lines, with a succession of work stations and conveyor means interconnecting the work stations and arranged for transporting respective one of the workpieces from, to and between the stations. The work stations include devices for removing and positioning assembly parts and a control for operating the devices.

Published German Patent Application No. 2,401,400 discloses an apparatus of this type, and the devices for removing and positioning workpieces or assembly parts to be mounted on these workpieces or on pallets comprise telescoping arms equipped with a gripping element for gripping the workpiece or assembly part or pallet. The feeding or removal of the workpiece, assembly part or pallet to and from the conveyor means interconnecting the work stations is effected by the linear lifting and/or the linear reciprocating movement of the telescoping arms and the gripping elements with which they are equipped.

Throughout the specification and claims, the term "workpiece" includes assembly parts and pallets carrying the workpiece or assembly parts.

This known apparatus is not universally useful since the displacement of the gripping element is not sufficiently accurate for many assembly operations. Difficulties arise in the use of this apparatus particularly when workpieces or assembly parts are to be mounted precisely within very narrow tolerance limits on preassembled workpieces or assembly parts. Additional difficulties arise when a pallet for the workpiece is precisely guided in the conveyor means and assembly parts are to be fed to the pallet or workpiece from a spacedly arranged feeding means for the assembly parts. When it is desired to manufacture workpieces of different structural series on such an assembly line, it is usually necessary to arrange several such gripping devices for removing different assembly parts from different and spaced feeding means.

It is the primary object of this invention to provide an apparatus of the indicated type with a mechanism for handling a workpiece whose gripping element is readily adapted to operate with high accuracy in different operating ranges.

It is a concomitant object of the invention to enable the workpiece to be handled and positioned relatively quickly.

The above and other objects are accomplished according to the present invention with a mechanism associated with each work station of the apparatus for handling a respective workpiece, the mechanism including a plurality of rectilinear guide tracks extending at an angle to each other, a first one of the guide tracks extending parallel to the elongated guide means for the conveyor means and two additional guide tracks, one of the additional guide tracks extending in a plane parallel to the plane defined by the elongated guide means and transversely thereto, and the other additional guide track extending in a plane perpendicular to the plane defined by the elongated guide means, a gripping element movable along the rectilinear guide tracks and capable of gripping the respective workpiece, and drive means associated with the guide tracks for moving the respective workpiece gripped by the gripping element between a first working position within the range of the conveyor means and a second working position spaced therefrom.

With this workpiece handling mechanism, it has become possible for the first time to adapt in a surprisingly simple manner the movement of the gripping element from the area in which it removes the workpiece from the feeding means to the area in which it positions the workpiece for assembly and within the latter area so that the workpiece may be precisely handled and simply centered for assembly in each work station. This is accomplished because the gripping element has an additional adjustment component in the direction of conveyance of the workpiece. This flexible adjustment in all directions furthermore facilitates the removal of assembly parts from different feeding means. The programmed sequence of the conveyor means and gripping element drive means operation enables the workpiece to be moved in a predetermined relation to the gripping element, in addition to the movements imparted to the workpiece by the guided motions of the gripping element. Thus, it is possible to position workpieces such as packing containers, bottles and the like, in a coordinate system, the operating time of the gripping element being shortened by the additional motion imparted to the workpiece by the conveyor means.

The above and other objects, advantages and preferred features of this invention will become more apparent from the following detailed description of certain now preferred embodiments thereof, taken in conjunction with the accompanying, generally schematic drawing wherein FIG. 1 is a fragmentary side elevational view of a section of an apparatus for the manufacture or the handling of workpieces according to the invention;

FIG. 4 is a like side elevational view, the gripping element of the handling mechanism being a tong-like gripper;

FIG. 5 is an end view of the handling mechanism of FIG. 4;

FIG. 6 is a top view of the handling mechanism of FIG. 4;

FIG. 7 is a fragmentary, enlarged view showing a universal holder for the gripper of FIGS. 4-6 in side elevation;

FIG. 8 is a top view of the universal holder of FIG. 7;

FIG. 9 shows a side elevational view of a vacuum suction device replaceably mountable in the universal holder of FIGS. 7 and 8, instead of the tong-like gripper;

FIG. 10 is a side elevational view of a pivoting device for the gripping element mounted between the universal holder and the gripping element;

Figure 1:
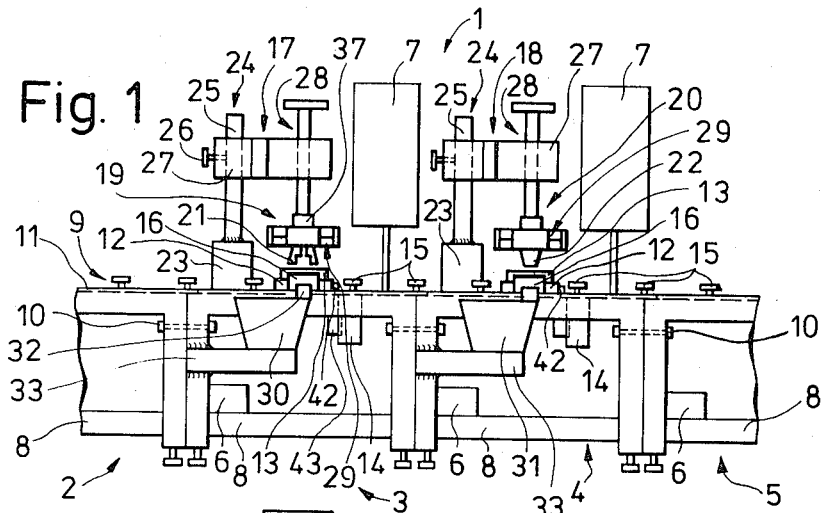

Referring now to the drawing and first to FIG. 1, the apparatus for the manufacture or the handling of workpieces is illustrated herein as assembly line 1. This apparatus comprises a succession of work stations, each station in the illustrated embodiment being constituted by a respective module 2, 3, 4 and 5. Each module has a common carrier frame 8 which is supported on the floor by vertically adjustable support legs. The apparatus further comprises conveyor means 9 interconnecting the work stations and arranged for transporting respective ones of workpieces 13 from, to and between the stations, elongated guide means 11 for the conveyor means, drive means 14 for the conveyor means, mechanism 17 associated with each work station for handling a respective one of the workpieces, and control 7. Common carrier frame 8 of each module supports the conveyor means, the handling mechanism and the control, and each module has power plant 6 for the drive means and the control. Thus, each module constitutes an independently replaceable work station in the assembly line where manual or automatic assembly operations may be effected. The portion of the conveyor means mounted on top of each module 2, 3, 4 and 5 is so arranged that, when the modules are interconnected by connecting bolts 10, a continuous conveying path is produced, the connecting bolts being suitably aligned for guidance of the modules and permitting ready replacement of individual modules in the assembly line. In the illustrated embodiment, the workpiece is carried by a pallet 12.

Conveyor means 9 includes elongated guide means 11 constituted by a track glidingly guiding pallets 12 holding workpieces or assembly parts 13. Drive means 14 (not all of them shown in FIG. 1) operates the conveyor means which is comprised in the illustrated embodiment of two rows of friction rollers 15 rotated by the drive means and frictionally engaging lateral faces of pallets 12 to advance the pallets along track 11.

According to a very important preferred feature of this invention, device 16 on each module fixes respective pallet 12 carrying a workpiece or assembly part transported by conveyor means 9 in an accurately predetermined position so that work may be performed on the workpiece or parts may be assembled therewith at the work station constituted by the module.

As shown in connection with modules 3 and 4, a mechanism 17, 18 is associated with each work station for handling a respective workpiece. Mechanism 17, 18 includes a plurality of rectilinear guide tracks extending at an angle to each other. First guide track 29 extends parallel to elongated guide means 11. One additional guide track 34 extends in a plane parallel to the plane defined by the elongated guide means and transversely thereto, and the other additional guide track 28 extends in a plane perpendicular to the plane defined by the elongated guide means. Gripping element 19, 20 is movable along the rectilinear guide tracks and is capable of gripping the respective workpiece (or pallet). Drive means are associated with the guide tracks for moving the respective workpiece (or pallet) gripped by the gripping element between a first working position within the range of conveyor means 9 and a second working position spaced therefrom. Control 7 is mounted on each module for operating drive means 14 for the conveyor means and the drive means for moving the workpiece in dependence on each other in a programmed sequence.

Fixing device 16 is arranged in the first working position of gripping element 19, 20 and includes actuating means connected to, and operated by, control 7. This arrangement enables the workpiece to be accurately positioned and fixed in the first working position so that a predetermined movement of the gripping element along respective ones of the guide tracks can always be used for feeding assembly parts to the workpiece (or pallet).

In the illustrated and preferred embodiment, the guide tracks are constituted by guide columns, a pair of guide columns 36 and 38 forming guide tracks 34 and 28. In this preferred embodiment, the drive means for moving the respective workpiece are constituted by pressure fluid operated cylinder-piston devices 76 and adjustable stops 51, 63, 64, 65 are arranged in the paths of the gripping element along the guide track columns. Preferably, shock absorbers 69, 75 are associated with the adjustable stops and extend parallel thereto. The use of columns as guide tracks assures accurate guidance for the gripping elements over a long stroke and thus a precise positioning for the handling of assembly parts. This construction is particularly advantageous in conjunction with cylinder-piston devices for moving the gripping elements along the columns, adjustable stops for holding the moved gripping elements in the moved position and associated shock absorbers, this combination of structural elements assuring not only accurate movements and positioning but also safe handling during the movement even of fragile parts. While the stops position the gripping elements precisely, the shock absorbers in the end position of the movement eliminate sharp impacts even in the course of relatively rapid movements.

According to another preferred feature illustrated herein, guide columns 41 constituting first guide track 29 are affixed to carrier element 40 and the gripping element is slidably mounted on guide columns 41, carrier element 40 being guided along guide columns 36 constituting the one additional guide track 34 extending in the same plane as elongated guide means 11 but transversely thereto. Pivoting device 87 for the gripping element slidably mounts the gripping element on guide columns 41 affixed to carrier element 40. The direct arrangement of the gripping element on the guide columns enables the structure to be relatively low and the pivoting device in the immediate range of the gripping element enables the moving masses during pivoting to be kept very small since no intermediate parts or links are required. In addition, neither the position of the gripping element nor that of the carrier element relative to the guide columns need be changed.

The illustrated embodiment further comprises holder 37 for guide columns 36 constituting the one additional guide track 34. Another pair of guide columns 38 constituting guide track 28 extends perpendicularly to the plane defined by elongated guide means 11 and holder 37 is slidably mounted on guide columns 38. Further carrier element 27 to which other guide columns 38 are affixed is arranged on fixed support 23 at the working station at an adjustable vertical spacing from elongated guide means 11 for conveyor means 9. Fixed support 23 is mounted laterally offset from the elongated guide means and affixed to the respective module constituting the working station. Guide columns 25 constituting guide track 24 extending perpendicularly to the plane defined by the elongated guide means are affixed to support 23. Carrier element 27 may be moved along columns 25 for vertical adjustment and may be fixed in a vertically adjusted position by set screws 16. Thus, the height of gripping element 19, 20 in relation to the workpiece transported on the conveyor means may be set by carrier element 27 and the gripping element may be moved on this carrier element along first guide track 29, one additional guide track 34 and other additional guide track 28, thus providing for universal adjustment of the gripping element with respect to the conveyor plane and path.

The double vertical adjustability of carrier element 40 of the gripping element not only makes it possible to mount several such carriers on a common fixed support to make it possible to operate at various superposed levels but, additionally, a supplemental vertical adjustment may be effected at a set level to adapt the gripping element to different levels at the point at which the assembly part is received and where it is then assembled. By arranging the gripping element, the carrier element, the holder and the further carrier element laterally displaced with respect to the fixed support, the rectilinear movement of the handling mechanism transversely to the conveyor means is not limited and assembly parts may be fed to the conveyor means from both sides.

Figure 2:
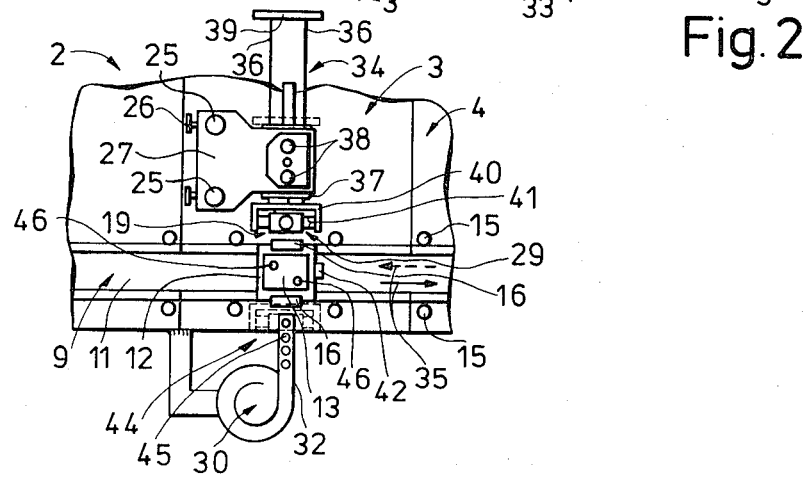
FIG. 2 is a fragmentary top view of one of the work stations of the apparatus of FIG. 1.

As best shown in FIGS. 1 and 2, assembly parts feeding means 30, 31 are associated with each module, the feeding means including linear conveyor 32 and the feeding means being mounted on brackets 33. The main conveying direction along assembly line 1 is indicated by arrows 35.

Guide columns 36 are mounted in holder 37 and the holder is slidably mounted on further carrier element 27 by guide columns 38. One of the ends of guide columns 36 are mounted in transverse yoke 39 and their other ends are mounted in carrier element 40. Guide columns 41 constituting first guide track 29 are mounted on carrier element 40 and gripping elements 19, 20 are slidably mounted on this carrier element.

Stop 42 operated by schematically indicated drive 43 is arranged in the conveying path of pallet 12 and may be adjusted by the drive to fix and position the pallet in the direction of arrow 35. As arrow 35 shown in broken lines indicates, an opposite conveying direction is also possible along elongated guide means 11, which would require a stop on the other side of the pallet. The linear conveyor 32 of assembly parts feeding means 30, 31 extends into the area 44 of the first working position to feed assembly parts 45 to the gripping element. These assembly parts, for example rivets or screws and the like, may then be gripped by the gripping element and placed into bores 46 in workpiece 13.

Figure 3:
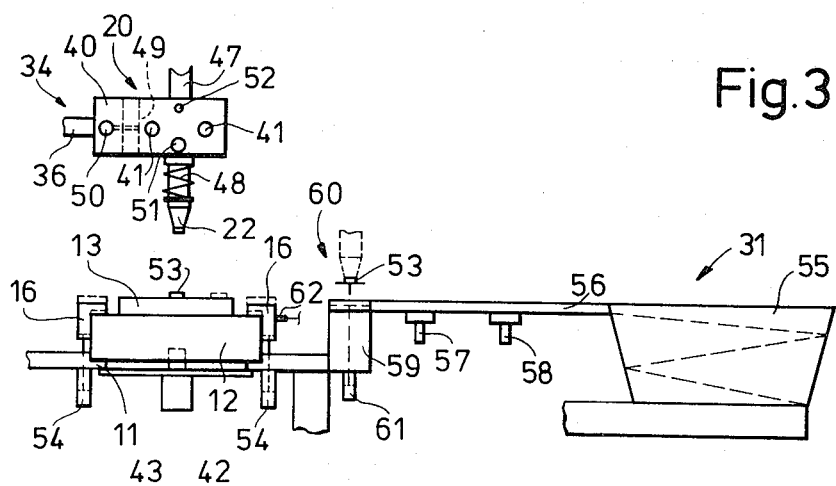
FIG. 3 is an enlarged side elevational view of one embodiment of a mechanism for handling a workpiece, the gripping element of the handling mechanism being a vacuum suction device.

FIG. 3 shows gripping element 20 which is a vacuum suction device 22 having a suction face for contacting the workpiece. The suction device is mounted on holder 47 for resilient movement perpendicularly to the suction face and to the plane defined by the elongated guide elements for the conveyor means, coil spring 48 biasing the suction device. Universal holder 49 is mounted in carrier element 40 and gripping element holder 47 is clamped in the universal holder which is slidable along guide columns 41 of first guide track 29 in the direction of the conveyor path indicated by arrows 35. In this embodiment, the drive means associated with this guide track for moving a respective workpiece gripping by gripping element 20 is constituted by a pressure fluid operated cylinder-piston device of which cylinder 50 is shown. Universal gripping element holder 49 may be steplessly moved along guide columns 41 by pressure fluid holding cylinder 50 which extends in carrier element 40 parallel to guide columns 41. If the cylinder-piston drive means has no piston rod, the length of the carrier element may be very limited even for a large stroke of the universal holder. Adjustable stops 51 on carrier element 40 delimit the adjustment path of universal holder 49 and limit switches 52 are associated with the adjustable stops to monitor the end position of the universal holder. Thus, pallet 12 carrying workpiece 13 is accurately fixed in position by device 16 and assembly part 53 is accurately fixed in position in relation to the workpiece by the movement of universal holder 49. Actuating means 54 for fixing device 16 is illustrated as a cylinder-piston device connected to, and operated by, control 7.

Feeding means 31 for assembly parts 53 is shown to comprise conveyor pot 55 delivering the assembly parts to linear conveyor 56, limit switches 57, 58 being mounted in the path of the linear conveyor to avoid jamming of parts and their exact guidance along this path. Singling means 59 at the end of the conveyor path lifts each individual assembly part above the level of the conveyor path where the part is gripped by element 22 in its working position 60 (where the vacuum suction device is shown in broken lines). Lifting of assembly part 53 by lifting device 61 of the singling means has the advantage that the lifted assembly part in contact with the suction surface will resiliently adjust element 22 on its holder 47 against the bias of spring 48, this movement producing a very strong vacuum for effectively gripping the assembly part. Furthermore, this resilient movement will compensate for minor positioning inaccuracies. A limit switch means constituted by pulsor 62 is mounted in at least one fixing device 16 to make certain that an assembly part is released from vacuum suction device 22 only when pallet 12 is positioned therebelow. As the illustrated embodiment shows, the use of the various guide tracks for the gripping element and standard coupling devices make it possible to use the same structural components for various handling mechanisms. This makes it possible to provide assembly line production for large numbers of workpieces and the modular system also makes it possible to mount only some of the guide tracks on fixed support 23 if only limited movements of the gripping element in one or two directions are required in the assembly operations. Obviously, any suitable drive means, such as mechanical or electro-mechanical drives, may be used instead of pressure fluid operated drives. Also, while guide columns have been shown to constitute the guide tracks for the gripping element, other suitable guide tracks may readily be substituted therefor.

FIGS. 4–6 show handling mechanism 17 on an enlarged scale to illustrate the cooperation of elongated conveyor guide means 11 with the mechanism more clearly. As shown, fixed support 23 for mechanism 17 is laterally displaced with respect to elongated guide means 11 and the coarse vertical adjustment of the level at which gripping element 19 is operated is effected by fixing further carrier element 27 in position on guide columns 25 by means of set screws 26. The lateral spacing of fixed support 23 from elongated guide means 11 and the vertical spacing of further carrier element 27 therefrom defines the working position of gripping element 19. The outer limits of the individual movements of the gripping element in the three directions of space are set by adjustable stops 63, 64 and 65 arranged in the paths of the gripping element along the guide track columns. Stop 63 serves to limit the lowering of gripping element 19 in the direction of elongated guide means 11, i.e. in a plane perpendicular to the plane defined thereby. As best illustrated in FIG. 5, assembly parts 45, such as screws, must be taken up by gripping element 19 from linear conveyor 32 at a level lower than that on which the assembly part is mounted on workpiece 13. Therefore, the vertical position of the gripping element must be adjustable to these two levels. This is accomplished by a stop 63 consisting of multiple abutments 66 and 67 selectively positionable in relation to the gripping element by cylinder-piston drives 68. Shock absorber 69 is associated with adjustable stop 63 and is arranged opposite thereto so as to dampen the movement of the gripping element at its end. The shock absorber may have an automatically changing, progressive and linear damping characteristic, and the associated stop and shock absorber enables the stop to be adjusted while the shock absorption remains constant since the compressed air shock absorbers require no adjustment.

In the position shown in FIG. 5, abutment bolts 66 and 67 of stop 63 are in their rest position at respective sides of the impact face of shock absorber 69. Limit switch means is arranged in the operating range of the stop and shock absorber, the illustrated limit switch means being limit switch 70 associated with the impact face affixed to the piston rod of the compressed air operated shock absorber. The limit switch may be an electromagnetic proximity fuse constituted by a so-called pulsor. This switch, as well as drives 68 for adjusting stop 63, are connected to, and operated by, control 7.

The drive means associated with guide track 28 for moving the workpiece gripped by gripping element 19 in a direction perpendicular to the plane defined by elongated guide means 11 comprises cylinder-piston device 72 for vertically adjusting the gripping element with respect to further carrier element 27, cylinder 71 of the device being incorporated in, or constituted by, the further carrier element. Shock absorber 69 assures a soft delay in the terminal part of the movement while the mechanical stop assures an exact location of the programmed movements and accurate positioning of the gripping element. It will be obvious to those skilled in the art that various adjustable stops may be used for delimiting the movements of the gripping element along the three guide tracks extending at an angle to each other. Thus, abutment bolts 66 and 67 in guide track 28, abutments 65 in guide track 19 and abutments 64 in track 34 may be constituted by threaded pins having a part extending beyond the impact face of the pin or by hexagonal screws 73 with nuts 74. Shock absorbers 75 are associated with stops 64 and arranged in the path of holder 37 to absorb the movement of drive means 77 constituted by cylinder-piston device 76. Stop 64 and shock absorber 75 are adjustably mounted in transverse yoke 39 interconnecting guide columns 36 at one end thereof while the other ends of these guide columns are mounted in carrier element 40. The two guide columns 41 constituting guide track 19 are also mounted on carrier element 40 and universal holder 78 is slidably mounted on these guide columns for movement in the conveying direction indicated by arrow 35 and extending parallel to elongated guide means 11, the universal holder being driven by drive means 79 incorporated in carrier element 40. Fixing device 16 and stop 42 cooperate to fix pallet 12 and workpiece 13 carried thereby in the position shown in FIGS. 4 and 6, enabling gripping element 19 to feed assembly parts 45, such as rivets or the like, to bores 46 in the workpiece without moving the pallet. The gripping element in this embodiment is a tong-like gripper 21.

The arrangement of the limit switch means makes it possible to monitor and control each component of the gripping element movements exactly so that assembly part 45 will be placed on workpiece 13 only when gripper 21 is accurately centered above one of bores 46. To enable the gripper to be centered over each bore, on the one hand, and with respect to the discharge end of linear feeding conveyor 32, on the other hand, stop 65 may also have multiple abutments, as shown in connection with stop 63. To stop the forward movement of pallet 12 in the direction of elongated guide means 11 of conveyor means 9, movable stop 42 may be inserted into the path of the moving pallet by drive means 43, such insertion interrupting the conveyance of the pallet. After the forward movement of the pallet has been stopped, fixing device 16 is operated to clamp the pallet in a vertically and laterally defined position.

While gripping element 19 has been shown in FIG. 2 in a position aligned with feeding means 31 for the assembly parts and laterally displaced from elongated guide means 11—in which position maintenance work may be done on the assembly line—, FIGS. 4 to 6 show the gripping element in the working position where assembly part 45 is held above a respective bore 46. After the assembly operation is completed, drive 43 is operated to remove stop 42 from the path of pallet 12 and a subsequent pallet 80 (shown in broken lines) drive by friction rollers 15 will push pallet 12 into the next succeeding work station constituted by module 4. The friction rollers are driven by drives 14 which may be individually operated electromotors or by a central drive via transmission belts.

Gripping element 19 may be vertically adjusted relative to workpiece 13 during the transportation of assembly parts 45 from feeding means 31 to the workpiece by means of stop 81, holder 37 being movable relatively rapidly against this stop which assures accurate positioning. Drive means 72 for the vertical movement, drive means 77 for the transverse movement, drive means 79 for the parallel movement, drive means 14 for the conveyor means friction rollers and drive means 43 for fixing device 16 are all connected to, and operated by, control 7 for operation in dependence on each other. However, in an effort not to crowd the illustration unduly, the electrical control lines from the drive means to the control have not been shown in FIGS. 4 to 6, nor have all the drives 14 and 43 been shown in FIGS. 4 and 5.

FIG. 7 is an enlarged partial view of universal holder 78 slidably mounted on guide columns 41. As shown, gripping element 19 has gripped 21 constituted by adjustable tongs 82 and guide part 83. The universal holder has clamping part 84 (more clearly seen in FIG. 8) arranged between guide part 83 and the guide column, the guide part cooperating with the clamping part to fix the gripping element vertically relative to the universal holder. Clamping part 84 is a forked holder whose open ends are compressed into clamping action by clamping bolt 85. As shown in FIG. 9, diameter 86 of guide part 83 of gripping element 20 is identical with the diameter of gripping element 19. This makes it possible rapidly to interchange the respective gripping elements, depending on whether a suction-type or tong-type gripper is more suitable for the assembly operation and the parts to be handled. This makes the assembly line readily adaptable to various assembly operations and also makes it possible to replace defective gripping elements quickly to reduce the down-time of the assembly line to a minimum.

The embodiment of FIG. 10 shows pivoting device 87 for gripping element 20, the pivoting device slidably mounting the gripping element on the guide column affixed to carrier element 27. The pivoting device also has a guide part 83 whose diameter 86 is identical with that of gripping element 19 so that it may be inserted into clamping part 84 of universal holder 78. Carrier port 88 is connected to guide part 83 and mounts pivoting device 89 consisting of two cylinders 90, 91 to which pressure fluid may be delivered in opposite directions and a rack arranged between the piston rods of the cylinders. Depending on the direction of pressure fluid delivery to the cylinders, a pinion keyed to pivoting axle 92 and meshing with the rack will cause a corresponding pivoting movement of the axle and universal holder 93 affixed to the lower end thereof, respective pivotal positions of holder 93 being shown in full and broken lines in FIG. 10. Pivoting drive 89 may be so arranged that the pivoting angle is fixed between 0° and 360°, and is selectively adjustable within this pivoting range. With this pivoting arrangement for gripping element 20, the moving masses are held to a minimum and an exact positioning of the gripping element may be obtained without subjecting the gripping element to oscillatory motions. Similar results are obtained by the cylinder-piston drives incorporated into the carrier elements and/or holders for the gripping element, which enable relatively high drive speeds and correspondingly short assembly times to be effected with high accuracy of the gripping element movements. When the cylinder-piston drives are mounted between the two guide columns constituting a respective guide track, the central force transmission will further assure a vibration-free movement of the carrier element or holder for the gripping element.

If the carrier elements and holders are two-part structures, the gripping element can be readily mounted on the same guide track system in a modular manner, enabling defective parts to be readily replaced and different gripping elements to be mounted in the modular structure with ease to adapt the apparatus to various uses with a minimum of component parts.

Figure 11:
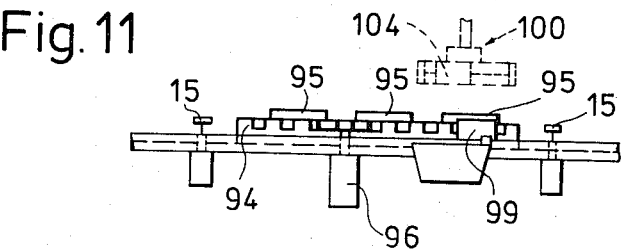
FIG. 11 is a side elevational view showing a pallet for receiving several workpieces or assembly parts, with an associated longitudinal adjustment and fixing device.
Figure 12:
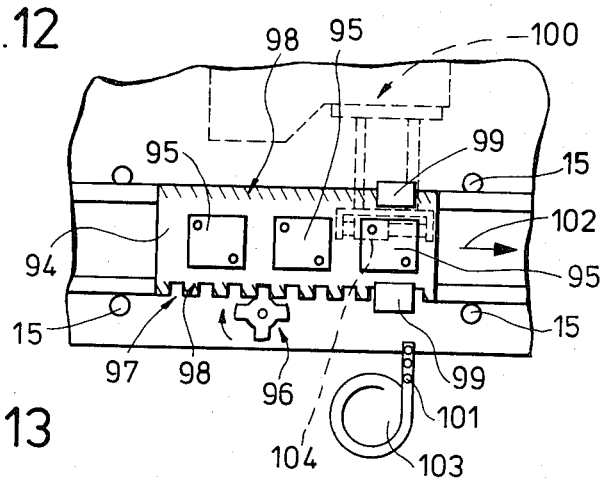
FIG. 12 is a top view of the arrangement of FIG. 11.

FIGS. 11 and 12 illustrate a preferred device for centering a workpiece transported by the conveyor means and for fixing the workpiece in the centered position, the centering and fixing device being arranged in the first working position of the gripping element within the range of the conveyor means and including actuating means connected to, and operated by, control 7. In the illustrated embodiment, pallet 93 is arranged to carry three workpieces 95 and drive 96 including a Maltese cross is arranged laterally adjacent the pallet whose lateral edge has rack 97 meshing with the Maltese cross. In addition, the two lateral edges of the pallet have obliquely extending teeth 98 meshing with oppositely directed teeth in fixing device 99. Outside the range of drive 96, pallet 94 is conveyed by friction rollers 15 described hereinabove. Maltese cross drive 96 is located in the range of handling mechanism 100 equivalent to mechanisms 17 or 18 hereinabove described in detail. Drive 96 and the drives of mechanisms 100 are coordinated to feed assembly parts 101 in a programmed manner to workpiece 95. All movements in the conveying direction indicated by arrow 102 may be effected by drive 96 while the positioning of assembly parts 101 with respect to workpieces 95 may be effected by the drives for gripping element 104 described hereinabove in connection with gripping elements 19 and 20.

Figure 13:
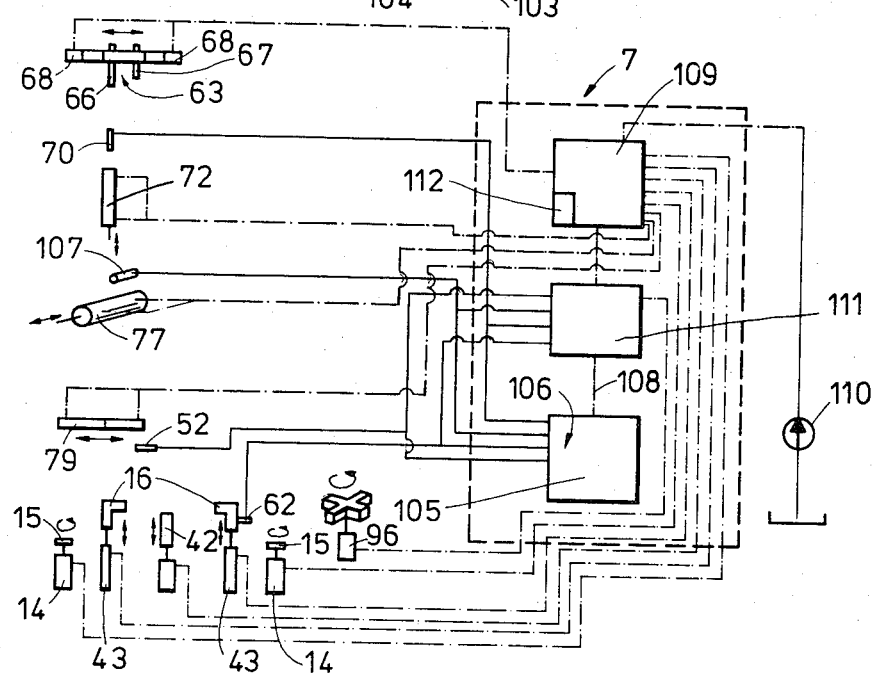
FIG. 13 illustrates a circuit diagram for the control.

FIG. 13 shows an embodiment of the control circuit of control 7 and its connection to the various drive and actuating means. The control includes control element 105 having inputs 106 and an output connected to output signal transmission line 108. Limit switches 52, 62, 70 and 107 have outputs connected to inputs 106 of control element 105. Limit switch 52 is associated with drive 79 controlling the movement of the gripping element in the conveying direction, i.e. parallel to elongated guide means 11 for the conveyor means. Limit switch 62 is associated with fixing device 16 (see FIG. 6) for fixing the workpiece transported by the conveyor means in position, the fixing device being arranged in the first working position of the gripping element and including actuating means 42, 43. Limit switch 70 is associated with stop 63 and limit switch 107 is associated with drive 77 controlling the movement of the gripping element in a direction transverse to the conveying direction.

Control element 105 has a circuitry arranged to transmit an output signal operating the actuating means of fixing device 16 upon energization of all the inputs. The output signal is transmitted through line 108 to circuit element 109 which is connected to pressure fluid generator 110 delivering pressure fluid to drives 43, 14, 68, 72, 77, 79, as well as 96, if provided, thus actuating fixing device 16, friction rollers 15 of conveyor means 9 and the respective movements in mechanisms 17 and 18 for handling the respective workpieces or assembly parts. The control may be programmed so that assembly part 95 may be properly assembled with workpiece 13 carried by pallet 12 or 94 while one of the handling mechanisms is simultaneously operated to grip an assembly part 101 delivered by feeding means 103 and move it into proper working position for assembly with the next succeeding workpiece. This greatly shortens the work time at each station.

The preferred control illustrated herein further comprises counter 111 connected between the output of control element 105 and the actuating means of the fixing device, i.e. circuit element 109, the counter generating an output signal for driving the conveyor means to transport a respective workpiece to a succeeding work station after a selected number of output signals for the timed operation of the actuating means of the fixing device. Thus, drive means 14 controlling the advance of the pallet will be operated only after several brief actuations of drive 96 for the advancement of the pallet to the next work station.

The control may further include logic control circuit 112 arranged to actuate drive 68 for adjusting one of the abutment bolts 66, 67 for a differentiated cooperation of stop 63 with shock absorber 69 after a single actuation of limit switches 52, 62, 70 and 107. This enables a further feeding cycle of an assembly part 45 from feeding means 31 to workpiece 13 to be effected while the positioning is changed. Furthermore, this also enables the abutment bolts to be adjusted to the different levels of feeding means 31.

The above-described and illustrated embodiment of control 7 dependably prevents damage to the gripping element and a premature advancement of the pallet or workpiece carried thereon before the assembly operation has been completed. The counter in the control makes it possible to effect several manipulations in the assembly operation while the movement of the gripping element remains substantially the same so that, for example, like assembly parts may be assembled with the workpiece at different locations thereof. Thus, no additional gripping elements are needed for such operations and the dependable operation as well as high economy of the assembly line are enhanced.

The logic control circuit facilitates the coordination and proper programming of the sequential actuations, enabling the actuation of subsequent movements to be interrupted promptly when a precedingly programmed step has not been completed.

The multiplicity of variations in the movements of the gripping element in handling mechanism 17 or 18 for taking a workpiece or assembly part from the feeding means supplying it to the assembly line, holding it in readiness and placing it in exact working position enables these mechanisms to be used for a multitude of assemblies. The same structural components may thus be used not only for assembling parts with workpieces but also for an assembly line used for packaging workpieces in a container. This considerably increases the economy of such an apparatus which can be used for the mass production of greatly varying products. The movements of the gripping element in the mechanisms is so accurate that the apparatus may be used for packaging or assembling very fragile parts, thus further increasing the usefulness of the apparatus.

It should be noted that various structural embodiments of stop 64 (see FIG. 6) may be selected, rather than the illustrated threaded pin adjustable by a nut. Adjustable stops constituted by cylinders, automatically driven nuts and the like may be used, for example. If adjustable multiple abutment stops, such as stop 63, are used in conjunction with universal holder 78, the universal holder for the gripping element may be properly centered transversely to elongated guide means 11 for conveyor means 9 for placing assembly parts 45 into alignment with bores 46. With such a multiple abutment stop, the universal holder may be driven in both positions into engagement with the stop so that an accurate mechanical centering is possible in both positions.

The gripping elements may also be readily adapted to desired uses and if a tong-like gripper is used, the tongs or jaws of the gripper may be adjusted in relation to each other by suitable stops which may be driven electrically, electromechanically or by pressure fluid drives. If desired, solenoid-operated magnetic grippers may be used instead of the illustrated vacuum suction devices.

While one embodiment of control 7 has been described and illustrated, those skilled in the art will be able to devise a variety of control circuits. The control elements and circuits may be analog or digital circuit elements, integrated circuits and/or relay control elements.

While the limit switch means have been described as pulsors, other well-known electrical, mechanical-electrical or electronic switch elements may be used and function equivalently. Furthermore, the control of the drives may include servo valves if these drives are pressure fluid operated cylinder-piston devices, these valves operating in combination with electromechanical transmitters monitoring the movements and receiving the output signals of the transmitters for control of the valves. Such transmitters may be constituted by potentiometers, capacitors or electric generators.

The present apparatus may be usefully incorporated into the assembly line disclosed and claimed in my co-pending U.S. application Ser. No. 143,049, filed Apr. 23, 1980, whose disclosure is incorporated herein by reference.

I claim:

1. An apparatus for the manufacture or the handling of workpieces, which comprises
   (a) a succession of work stations,
   (b) conveyor means interconnecting the work stations and arranged for transporting respective ones of the workpieces from, to and between the work stations,
   (c) elongated guide means for the conveyor means,
   (d) a mechanism associated with each one of the work stations for handling a respective one of the workpieces, the mechanism including
      (1) a fixed support,
      (2) three rectilinear guide tracks extending perpendicularly to each other, a first one of the guide tracks extending in a plane perpendicular to the plane defined by the elongated guide means and being affixed to the fixed support, and two additional guide tracks extending in a plane parallel to the plane defined by the elongated guide means, one of the additional guide tracks extending parallel to the elongated guide means and the other one of the additional guide tracks extending perpendicularly thereto,
      (3) a holder slidably mounted on the first guide track and one of the additional guide tracks being affixed to the holder,
      (4) a carrier element slidably mounted on the additional guide track affixed to the holder and another one of the additional guide tracks being affixed to the carrier element,
      (5) a gripping element slidably mounted on the additional guide track affixed to the carrier element and capable of gripping the respective workpiece, and
      (6) drive means associated with the guide tracks for moving the respective workpiece gripped by the gripping element along respective ones of the guide tracks, and
   (e) a control for operating the drive means in dependence on each other.

2. The apparatus of claim 1, further comprising a device for fixing the respective workpiece transported by the conveyor means in position, the fixing device being arranged in a working position of the gripping element within the range of the conveyor means and including an actuating means connected to, and operated by, the control.

3. The apparatus of claim 1, wherein the guide tracks are constituted by guide columns and the drive means are constituted by pressure fluid operated cylinder-piston devices.

4. The apparatus of claim 3, further comprising an adjustable stop arranged in the paths of the gripping element along the guide track columns and a shock absorber associated with the adjustable stop and extending parallel thereto.

5. The apparatus of claim 3, further comprising a pivoting device for the gripping element, the pivoting device slidably mounting the gripping element on the guide column affixed to the carrier element.

6. The apparatus of claim 3 or 4, comprising a further carrier element for the holder, the further carrier element being slidably mounted on the guide columns constituting the first guide track at an adjustable spacing from the elongated guide means.

7. The apparatus of claim 6, wherein the gripping element, the carrier element, the holder and the further carrier element are arranged laterally displaced with respect to the elongated guide means.

8. The apparatus of claim 6, wherein the shock absorber extends parallel to the adjustable stop, the adjustable stop and associated shock absorber being respectively arranged opposite each other in the carrier element, the holder and the further carrier element, and limit switch means arranged in the operating ranges of the stop and shock absorber.

9. The apparatus of claim 8, further comprising means for adjusting the length of the stop and for fixing the stop in the adjusted length.

10. The apparatus of claim 3, further comprising a universal holder for the gripping element, the universal holder being mounted in the carrier element, the gripping element having a guide part and the universal holder having a clamping part arranged between the guide part and the guide column constituting the first guide track, the guide part cooperating with the clamping part.

11. The apparatus of claim 10, wherein the carrier element incorporates the cylinder of a respective one of the cylinder-piston devices.

12. The apparatus of claim 6, wherein the further carrier element incorporates the cylinder of a respective one of the cylinder-piston devices.

13. The apparatus of claim 4, wherein the adjustable stop has multiple abutments selectively positionable in relation to the gripping element.

14. The apparatus of claim 3, wherein at least one of the guide tracks is constituted by a pair of said guide columns, and a respective one of the cylinder-piston devices is positioned between the guide columns of said pair.

15. The apparatus of claim 1, wherein the gripping element is a tong-like gripper.

16. The apparatus of claim 1, wherein the gripping element is a vacuum suction device having a suction face for contacting the workpiece, and the vacuum suction device being mounted for resilient movement perpendicularly to the suction face.

17. The apparatus of claim 1, further comprising a device for centering the respective workpiece transported by the conveyor means and for fixing the workpiece in the centered position, the centering and fixing device being arranged in a first working position of the gripping element within the range of the conveyor means and including an actuating means connected to, and operated by, the control.

18. The apparatus of claim 17, wherein the centering and fixing device is comprised of cooperating clamping parts.

19. The apparatus of claim 18, comprised of a succession of modules constituting the work stations, each of the modules having a common carrier frame for the conveyor means, the handling mechanism and the control, and each module having a power plant for the drive means and the control.

20. The apparatus of claim 19, further comprising a workpiece feeding means arranged on the common carrier frame of the module.

21. The apparatus of claim 20, wherein the handling mechanism is arranged opposite to the workpiece feeding means, a conveyor means is arranged therebetween, and the first working position of the gripping element being located along a longitudinally extending side of the conveyor means facing the workpiece feeding means.

22. The apparatus of claim 21, wherein the workpiece feeding means has a portion facing the first working position of the gripping element, and further comprising a lifting drive for vertically adjusting the workpiece feeding means portion, and the lifting drive being connected to, and operated by the control when a respective one of the workpieces and the gripping element are in the first working position.

23. The apparatus of claim 22, wherein the lifting device has a stroke whose length corresponds to the length of the workpiece.

24. The apparatus of claim 1, further comprising a device for fixing the respective workpiece transported by the conveyor means in position, the fixing device being arranged in a first working position of the gripping element within the range of the conveyor means and including an actuating means connected to, and operated by, the control, the handling mechanism including respective stops delimiting the movements of the workpiece and cooperating limit switch means having outputs, the control including a control element having inputs and an output, the outputs of the limit switch means being connected to the inputs of the control element, and the control element transmitting an output signal operating the actuating means of the fixing device upon energization of all the inputs.

25. The apparatus of claim 24, further comprising a counter connected between the output of the control element and the actuating means of the fixing device, the counter generating an output signal for driving the conveyor means to transport the respective workpiece to a succeeding one of the work stations after a selected number of said output signals for the timed operation of the actuating means of the fixing device.

26. The apparatus of claim 24, wherein the control further includes a logic control circuit actuating selected ones of the stops in response to the energization of selected ones of the inputs of the control element.

* * * * *